United States Patent
Hou et al.

(10) Patent No.: US 12,380,344 B2
(45) Date of Patent: Aug. 5, 2025

(54) GENERATING SUMMARY AND NEXT ACTIONS IN REAL-TIME FOR MULTIPLE USERS FROM INTERACTION RECORDS IN NATURAL LANGUAGE

(71) Applicant: International Business Machines Corporation, Armonk, NY (US)

(72) Inventors: Yufang Hou, Dublin (IE); Akihiro Kishimoto, Setagaya (JP); Beat Buesser, Ashtown (IE); Bei Chen, Blanchardstown (IE)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 17/139,214

(22) Filed: Dec. 31, 2020

(65) Prior Publication Data
US 2022/0207392 A1 Jun. 30, 2022

(51) Int. Cl.
G06N 5/04 (2023.01)
G06F 40/174 (2020.01)
(Continued)

(52) U.S. Cl.
CPC .............. *G06N 5/04* (2013.01); *G06F 40/174* (2020.01); *G06F 40/186* (2020.01);
(Continued)

(58) Field of Classification Search
CPC ....... G06N 5/04; G06F 40/174; G06F 40/186; G06F 40/205; G06F 40/279; G10L 15/22; G10L 15/26
See application file for complete search history.

(56) References Cited

U.S. PATENT DOCUMENTS 9,094,361 B2   7/2015   Camacho et al.
10,102,198 B2  10/2018  Astigarraga et al.
(Continued)

FOREIGN PATENT DOCUMENTS

CN   106685916 A   5/2017
CN   110741601 A   1/2020
(Continued)

OTHER PUBLICATIONS

Punyakanok, Vasin, Dan Roth, and Wen-tau Yih. "Natural language inference via dependency tree mapping: An application to question answering." (Year: 2004).*
(Continued)

*Primary Examiner* — Paras D Shah
*Assistant Examiner* — Oluwadamilola M Ogunbiyi
(74) *Attorney, Agent, or Firm* — Scully, Scott, Murphy & Presser, P.C.; Yuanmin Cai

(57) ABSTRACT

A system receives messaging, video and/or audio input streams including dialogue spoken by users at a group meeting. From these inputs, the system obtains single or multiple interaction records including natural language text memorializing content spoken by each speaker at a meeting, analyzes the content, and identifies single or multiple action item tasks in the interaction records. The system then generates summaries indicating the action item tasks for the users. From the dialogue content, the system further detects whether each action item is addressed, and whether the action item for a user has a solution, or not. The system further detects whether one action item is a precondition for resolving another action item by the user or in conjunction with another user. Using a pre-configured template, the system generates action item summaries, any associated solution, and any relationship or precondition between action items and presents the summary to a user.

14 Claims, 7 Drawing Sheets

(51) Int. Cl.
  *G06F 40/186* (2020.01)
  *G06F 40/205* (2020.01)
  *G06F 40/279* (2020.01)
  *G06F 40/30* (2020.01)
  *G06N 20/00* (2019.01)
  *G10L 15/22* (2006.01)
  *G10L 15/26* (2006.01)

(52) U.S. Cl.
  CPC .......... *G06F 40/279* (2020.01); *G06N 20/00* (2019.01); *G10L 15/22* (2013.01); *G10L 15/26* (2013.01); *G06F 40/205* (2020.01); *G06F 40/30* (2020.01)

(56) References Cited

U.S. PATENT DOCUMENTS

| | | | |
|---|---|---|---|
| 10,157,618 B2* | 12/2018 | Higbie | G06Q 30/0203 |
| 10,181,326 B2 | 1/2019 | Raanani et al. | |
| 10,262,654 B2 | 4/2019 | Hakkani-Tur et al. | |
| 10,318,636 B2 | 6/2019 | Chatterjee et al. | |
| 10,373,588 B2 | 8/2019 | Sergott et al. | |
| 10,984,193 B1* | 4/2021 | Shalev | G06N 3/045 |
| 11,200,885 B1* | 12/2021 | Mandal | G06F 40/279 |
| 11,520,813 B2* | 12/2022 | Boguraev | G06F 40/211 |
| 2006/0235694 A1* | 10/2006 | Cross | G06F 16/95 704/270.1 |
| 2007/0033086 A1 | 2/2007 | Christensen et al. | |
| 2007/0112926 A1 | 5/2007 | Brett et al. | |
| 2009/0259718 A1 | 10/2009 | O'Sullivan et al. | |
| 2013/0138746 A1* | 5/2013 | Tardelli | H04L 51/52 709/206 |
| 2015/0100356 A1* | 4/2015 | Bessler | G06Q 10/0631 705/7.12 |
| 2015/0234806 A1 | 8/2015 | Bhagwan et al. | |
| 2015/0348538 A1 | 12/2015 | Donaldson | |
| 2017/0032260 A1* | 2/2017 | Bhagwat | G10L 15/26 |
| 2017/0134446 A1 | 5/2017 | Kitada et al. | |
| 2017/0161258 A1 | 6/2017 | Astigarraga et al. | |
| 2017/0316777 A1* | 11/2017 | Perez | G06F 40/35 |
| 2018/0131904 A1 | 5/2018 | Segal | |
| 2018/0232436 A1* | 8/2018 | Elson | G06F 40/30 |
| 2018/0350395 A1* | 12/2018 | Simko | G10L 15/187 |
| 2019/0130355 A1 | 5/2019 | Gupta et al. | |
| 2019/0132265 A1 | 5/2019 | Nowak-Przygodzki et al. | |
| 2019/0156366 A1 | 5/2019 | Wilson et al. | |
| 2019/0189117 A1 | 6/2019 | Kumar | |
| 2019/0294261 A1* | 9/2019 | Lohse | G02B 27/017 |
| 2019/0339820 A1 | 11/2019 | Wu et al. | |
| 2019/0341050 A1 | 11/2019 | Diamant et al. | |
| 2019/0392066 A1* | 12/2019 | Kim | G06F 16/24578 |
| 2020/0133745 A1* | 4/2020 | Dugan | H04W 4/021 |
| 2020/0184155 A1* | 6/2020 | Galitsky | G06F 40/279 |
| 2020/0201496 A1 | 6/2020 | Wong | |
| 2020/0243095 A1 | 7/2020 | Adlersberg et al. | |
| 2020/0409519 A1* | 12/2020 | Faulkner | H04N 7/155 |
| 2021/0110895 A1* | 4/2021 | Shriberg | G06F 40/20 |
| 2021/0174023 A1* | 6/2021 | Gao | G06F 40/35 |
| 2021/0342551 A1* | 11/2021 | Yang | G06N 3/08 |
| 2021/0342689 A1* | 11/2021 | Schuff | G06N 5/045 |
| 2021/0342785 A1* | 11/2021 | Mann | H04L 51/48 |
| 2022/0013235 A1* | 1/2022 | Al-Sinan | G06F 21/6245 |
| 2022/0067285 A1* | 3/2022 | Sellam | G06F 40/205 |

FOREIGN PATENT DOCUMENTS

| | | | | |
|---|---|---|---|---|
| CN | 112075075 A | | 12/2020 | |
| CN | 114691857 A | | 7/2022 | |
| DE | 102020106066 A1 * | | 9/2021 | |
| EP | 3364295 B1 * | | 8/2020 | G06F 16/22 |
| GB | 2569440 A | | 6/2019 | |
| GB | 2603842 A | | 8/2022 | |
| JP | 2012-053628 A | | 3/2012 | |
| JP | 2019-061594 A | | 4/2019 | |
| JP | 2019-191276 A | | 10/2019 | |
| JP | 2022-105273 A | | 7/2022 | |
| KR | 102623727 B1 * | | 1/2024 | |
| WO | WO-2019093239 A1 * | | 5/2019 | G06F 16/90332 |

OTHER PUBLICATIONS

Herrera, Jesus, Anselmo Penas, and Felisa Verdejo. "Textual entailment recognition based on dependency analysis and WordNet." Machine Learning Challenges Workshop. Berlin, Heidelberg: Springer Berlin Heidelberg. (Year: 2005).*

Sammons, Mark, VG Vinod Vydiswaran, and Dan Roth. "Ask not what textual entailment can do for you . . . " Proceedings of the 48th Annual Meeting of the Association for Computational Linguistics. (Year: 2010).*

Poliak, Adam. "A survey on recognizing textual entailment as an NLP evaluation." arXiv preprint arXiv:2010.03061. (Year: 2020).*

Nielsen, Rodney D., Wayne Ward, and James H. Martin. "Recognizing entailment in intelligent tutoring systems." Natural Language Engineering 15.4 (2009): 479-501. (Year: 2009).*

Iftene, Adrian. "Textual Entailment." Eurolan 2007 Summer School Alexandru Ioan Cuza University of Iaşi (2009): 99. (Year: 2009).*

Sharma, Nidhi, Richa Sharma, and Kanad K. Biswas. "Recognizing textual entailment using dependency analysis and machine learning." Proceedings of the 2015 Conference of the North American Chapter of the Association for Computational Linguistics: Student Research Workshop. 2015. (Year: 2015).*

He, Luheng, Mike Lewis, and Luke Zettlemoyer. "Question-answer driven semantic role labeling: Using natural language to annotate natural language." Proceedings of the 2015 conference on empirical methods in natural language processing. 2015. (Year: 2015).*

Examination Report dated Jul. 22, 2022 from related application GB2117761.3.

Chen et al.; "Detecting Actionable Items in Meetings by Convolutional Deep Structured Semantic Models", ASRU IEEE Workshop On, pp. 375-382, Dec. 13-17, 2015.

Purver et al.; "Detecting Action Items in Multi-Party Meetings: Annotation and Initial Experiments", MLMI'06 3rd ACM International Workshop On, pp. 200-211, May 1-4, 2006.

Moore et al.; "ActiveNavigator: Toward Real-Time . . . In Design Workspace*", International Journal of Engineering Education, vol. 34, No. 2(B), pp. 723-733, Jan. 12, 2018.

Chen, et al., "AIMU: Actionable Items For Meeting Understanding", LREC 10th International Conference On, pp. 739-743, Jun. 24, 2016, https://www.microsoft.com/en-us/research/wp-content/uploads/2016/06/LREC16_AIMU.pdf.

Whittaker et al.; "Design and Evaluation of Systems to Support Interaction Capture and Retrieval", Personal and Ubiquitous Computing, vol. 12,No. 3,pp. 197-221,Jan. 2008.

Li et al.; "Keep Meeting Summaries on Topic: Abstractive Multi-Modal Meeting Summarization", Proceedings of the 57th Annual Meeting of the Association for Computational Linguistics, pp. 2190-2196, Florence, Italy, Jul. 28-Aug. 2, 2019. 2019 Association for Computational Linguistics, https://www.aclweb.org/anthology/P19-1210.pdf.

Wang et al.; " ", Proceedings of the 13th Annual Meeting of the Special Interest Group on Discourse and Dialogue (SIGDIAL), pp. 304-313, Seoul, South Korea, Jul. 5-6, 2012. 2012 Association for Computational Linguistics, https://www.cs.cornell.edu/home/cardie/papers/SIGDIAL12-Focused.pdf.

Shang et al.; "Unsupervised Abstractive Meeting Summarization with Multi-Sentence Compression and Budgeted Submodular Maximization", Proceedings of the 56th Annual Meeting of the Association for Computational Linguistics (Long Papers), pp. 664-674, Melbourne, Australia, Jul. 15-20, 2018. 2018 Association for Computational Linguistics, https://www.aclweb.org/anthology/P18-1062.pdf.

Purver et al.; "Detecting and Summarizing Action Items in Multi-Party Dialogue", SIGDIAL 2007. http://www.eecs.qmul.ac.uk/~mpurver/papers/purver-et-al07sigdial.pdf; https://pdfs.

(56) References Cited

OTHER PUBLICATIONS semanticscholar.org/e381/e352f9a5e2673ccfd6e3ec51f21838f7b250. pdf ?_ga=2.206067603.1835270448.1583754516-1574297060. 1581534581 8 pages.
Office Action dated Jun. 10, 2022 received from the United Kingdom Patent Office in related GB 2117761.3.
Response to Office Action dated Jun. 15, 2022 filed in GB 2117761.3.
"The Stanford Question Answering Dataset", SQuAD 2.0, downloaded from the Internet on Oct. 7, 2020, 38 pages, https://rajpurkar.github.io/SQuAD-explorer/.
Japan Patent Office, "Notice of Reasons for Refusal" May 20, 2025, 06 Pages, JP Application No. 2021-201458.
Keizer et al., "Detecting and Summarizing Action Items in Multi-Party Dialogue", Proceedings of the 8th SIGdial Workshop on Discourse and Dialogue, Dec. 31, 2007-Sep. 2, 2007, 16 pages.

* cited by examiner

GENERATING SUMMARY AND NEXT ACTIONS IN REAL-TIME FOR MULTIPLE USERS FROM INTERACTION RECORDS IN NATURAL LANGUAGE

FIELD

The present invention relates to applications of Natural Language Processing (NLP) and Machine Learned models (ML-models) for managing a meeting, and more particularly, to detecting action items of meeting transcripts and determining their status (e.g. completed or open, etc.) to facilitate continuous effective collaboration of distributed groups of users.

BACKGROUND

Generally, participants of a meeting regard "action items," i.e., public commitments to perform a given task, as one of a meeting's most important outputs. However, spoken action item detection is a relatively new task.

A person who joins a meeting a few minutes late should be able to learn what has been discussed before joining such as what tasks (action item) has been assigned, what kind of task has been already answered by the others, and what kind of action item is waiting unanswered for the particular person.

SUMMARY

The following summary is merely intended to be exemplary. The summary is not intended to limit the scope of the claims.

According to an aspect, the present disclosure provides for a system and a method for rapidly and automatically extracts action items from the meeting conversations and summarizes the meeting's dialogue in real time and present actions needed to be made so that a user can address the items unresolved in a meeting.

The system and methods described herein aims to summarize the action items in meetings which include: 1) action items; 2) relations between different action items; 3) solutions for each action item.

According to an aspect, the system and method invokes operations to determine tasks that a user is responsible for based on interactions among attendees of a meeting and provide meeting summaries for informing the user of the tasks and other information required of the user attending a meeting.

According to an aspect, the system and method invokes operations providing functionality to inform the team members or other users of the tasks and other information required of team members or users attending the meeting, where team members/users are joining the meeting after it has started.

In an embodiment, the meeting summaries provides a list of action items, the identified relations between different action items, and further provides recommended solutions for each action item.

According to an aspect, there is provided a computer-implemented method. The method comprises: receiving, at one or more processors, multiple interaction records of natural language text relating to a group of users attending a meeting; analyzing, using one or more classifier models, the text of the multiple interaction records to identify one or more action items from the text, an action item relating to a respective task to be performed; detecting, from the interaction records, a respective user assigned to perform the respective task; detecting, from the interaction records, whether each action item is addressed with a solution for carrying out the task or not; and generating a text summary of a solution that addresses each action item for the user.

According to one aspect, there is provided a computer-implemented system. The system comprises: a memory storage device for storing a computer-readable program, and at least one processor adapted to run said computer-readable program to configure the at least one processor to: receive multiple interaction records of natural language text relating to a group of users attending a meeting; analyze, using one or more classifier models, said text of said multiple interaction records to identify one or more action items from said text, an action item relating to a respective task to be performed; detect, from said interaction records, a respective user assigned to perform the respective task; detect, from said interaction records, whether each action item is addressed with a solution for carrying out said task or not; and generate a text summary of a solution that addresses each action item for the user.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
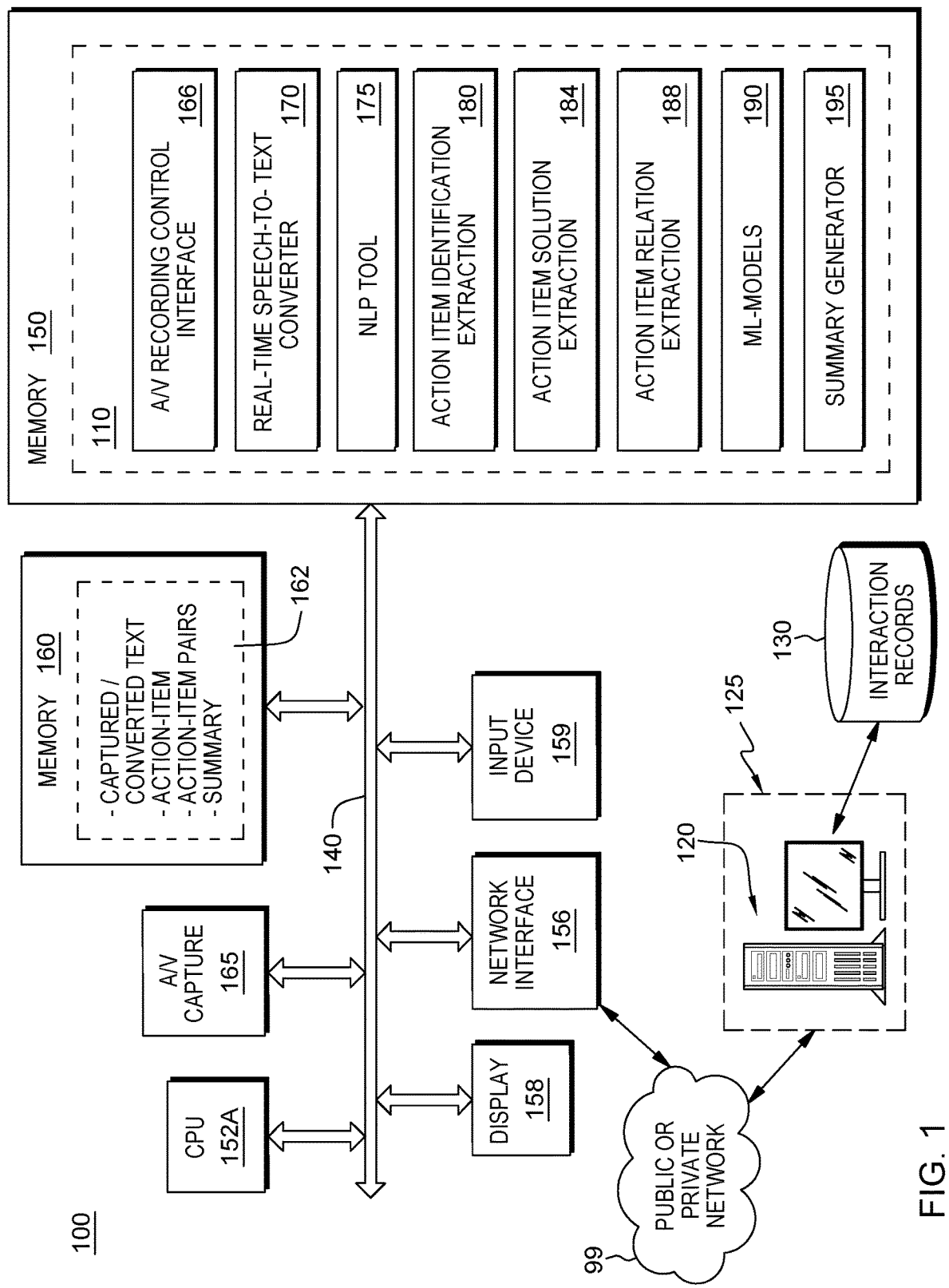
FIG. 1 depicts a system block diagram of an embodiments of a computer system tool for automatically generating action item summaries and next actions in real-time for multiple users from interaction records according to an embodiment of the present invention.

According to an aspect, the present disclosure generally provides for a system and methods to rapidly and automatically facilitate manual coordination tasks for the continuous effective collaboration of distributed users. In this endeavor, the system and methods invoke operations to summarize a group meeting in real time and present action items needed to be made so that each user can address the action items unresolved in a meeting.

In such endeavor, the system enables a person who joins a meeting a few minutes late to learn what has been discussed at the meeting before joining the meeting, i.e.: is able to be informed as to what kind of new task has been assigned, what kind of task has been already answered by the others, and what kind of question is waiting unanswered for this person.

For a user, e.g., an employee of an enterprise, who needs to handle multiple tasks while attending a meeting, and whose name is called on the meeting, the system and methods ensure that that user is able to: understand what is the current situation of the meeting, and what kind of question has been asked by receiving an interactive summary of what has already been discussed in the meeting.

Thus, in accordance with further aspects of the present disclosure, a system and method is described herein that allows multiple users to interact on tasks based on input interaction records in natural language text or audio shared by multiple users, such as a log of conversations obtained from meetings, threads of emails, instant messages, messages communicated via Slack Technologies Inc. messaging platform, Twitter messaging platform, etc. The system and methods described herein further continuously summarizes what has been discussed, mentioned, or concluded expectedly or implicitly. Further, the system and methods described herein presents summaries containing one or multiple pending action items for each user(s) that appeared in its absence. The system and methods described herein further presents action items which have been addressed by the other group users, e.g., with a summary of actions, resolutions, etc.

According to an aspect, in addition to meeting summaries, the system and method analyses the relations between different action items and further provides solutions for each action item.

The system and methods described herein can be applied to any meetings to detect from the meeting transcripts, in real-time, relations between action items and solutions for each action item.

The system and methods described herein invokes operations to summarize the action items in meetings which include: 1) action items; 2) relations between different action items; 3) solutions for each action item. In an aspect, the system summarizes the meeting in real time and presents actions that need to be made so that items unresolved in the meeting can be addressed.

In an embodiment, the method and system provides a meeting summary with a list of actions, analyses the relations between different action items and further provides solutions for each action item. The method and system manages a conversation by identifying action items, detecting the relationship among action items and suggests solutions.

With reference now to FIG. 1, there is provided a system 100, e.g., a collaboration tool that is embodied as one or more computer systems implementing methods to automatically make action items available to a meeting attendee who arrives late to the meeting. As a non-limiting example scenario, a collaborating group of users meet via an on-line web-conference or messaging platform that enables remote meetings based on VoIP, online video, instant messaging, file sharing, and screen sharing, and the tool is operated when a user is running late or cannot join until after the meeting has started. In accordance with an embodiment, software application analyzes the meeting dialog by invoking NLP operations to determine tasks, i.e., action items, that the user is responsible for based on interactions among attendees of the meeting. The system informs the user of the tasks and other information required of the user attending the meeting, i.e., before the user attends the meeting.

As shown in FIG. 1, system 100 is a computing system providing a tool configured for generating summaries including action items for users or groups of multiple users to facilitate communication and collaboration among the group(s) of users. The tool is embodied as a computing system having at least the components as shown. In one embodiment, the action item and summary generation tool 100 implements NLP analytics methods for detecting action items based on one or more natural language text, video, audio and/or audio/video (A/V) inputs. The system tool 100 implements NLP analytics techniques and machine learned models 190 including learning algorithms for training the models to detect action items including next action items, e.g., to enhance the collaboration effort for the group of users. In an embodiment, the tool 100 invokes operations providing functionality to inform the team members or other users of the tasks and other information required of team members or users attending the meeting, where team members/users are joining the meeting after it has started.

As shown in FIG. 1, in the context of automatically generating summaries and action items for users or groups of multiple users according to one embodiment, tool 100 is a computer system, a computing device, a mobile device, or a server. In some aspects, computing device 100 may include, for example, personal computers, laptops, tablets, smart devices, smart phones, or any other similar computing device.

Computing system 100 includes one or more hardware processors, e.g., hardware processor 152, a memory 150, e.g., for storing an operating system, application program interfaces (APIs) and program instructions, a network interface 156, a display device 158, an input device 159, and any other features common to a computing device. In some aspects, computing system 100 may, for example, be any computing device that is configured to communicate with one or more web-sites 125 including a web-based or cloud-based server 120 over a public or private communications network 99. For instance, a web-site may host web conferencing software or store current meeting videoconference or records/transcripts or interaction records of meetings thereof. Such structured/unstructured electronic-based textual interaction records may be stored in a database 130.

Further, as shown as part of system 100, there is provided a local memory useful for a data processing framework which may include an attached memory storage device 160, or a remote memory storage device, e.g., a database, a lexical database, an ontology, accessible via a remote network connection for input to or use by the system 100.

In the embodiment depicted in FIG. 1, processor 152 may include, for example, a microcontroller, Field Programmable Gate Array (FPGA), or any other processor that is configured to perform various operations. Additionally shown are the communication channels 140, e.g., wired connections such as data bus lines, address bus lines, Input/Output (I/O) data lines, video bus, expansion busses, etc., for routing signals between the various components of system 100. Processor 152 is configured to execute method instructions as described below. These instructions may be stored, for example, as programmed modules in a further associated memory storage device 150.

Memory 150 may include, for example, non-transitory computer readable media in the form of volatile memory, such as random access memory (RAM) and/or cache memory or others. Memory 150 may include, for example, other removable/non-removable, volatile/non-volatile storage media. By way of non-limiting examples only, memory 150 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 156 is configured to transmit and receive data or information to and from a web-site server 120, e.g., via wired or wireless connections. For example, network interface 156 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 158 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 158 may include a liquid crystal display (LCD), an e-paper/e-ink display, an organic LED (OLED) display, or other similar display technologies. In some aspects, display 158 may be touch-sensitive and may also function as an input device.

Input device 159 may include, for example, a keyboard, a mouse, a touch-sensitive display, a keypad, a microphone, or other similar input devices or any other input devices that may be used alone or together to provide a user with the capability to interact with the computing device 100. In an embodiment, through the user interface, the user can enter a command or utterance to activate or deactivate the system modules and invoke operations at the modules for real-time system processing.

In one embodiment, an audio/video data capture unit 165 is provided to capture real-time A/V and conferencing streams from one or more users at a meeting, e.g., a virtual or on-line meeting such as ZOOM™ (Zoom Video Communications, Inc), Webex™ (Cisco Systems, Inc.), GoToMeeting™ (LogMeIn USA, Inc.), etc. for analysis and action item extraction processing according to the embodiments herein.

With respect to configuring the computer system as an analysis tool for summarizing the action items in meetings which include: 1) action items; 2) relations between different action items; 3) solutions for each action item, the local or remote memory 160 may be configured for temporarily storing or using text data or information 162 including, but not limited to: any captured message threads or messaging dialogs to be NLP analyzed, action items, extracted action item-solution pairs, the identified relations between action items, or template(s) used to automatically generate a summary.

This data may alternately be stored in a separate local memory storage device attached to the computer system 100.

As shown in FIG. 1, memory 150 of computer system 100 further stores processing software or application modules that include programmed instructions adapted to configure the tool to provide an analysis of the meeting and summary of detected action items for users, their solutions and any next action items.

In one embodiment, one of the programmed processing modules stored at the associated memory 150 include a audio/video control interface module 166 that provides instructions and logic for operating circuitry to initiate the capture of the real-time meeting conversation or on-line meeting audio or A/V dialog or like messaging media (e.g., text) input. In an embodiment, via at least one application program interface 166 for controlling A/V recording, the system receives an input activation or deactivation signal from a user device, e.g., to responsively trigger or terminate system module operations.

In an embodiment, a speech-to-text conversion module 170 provides instructions and logic for operating circuitry to receive and convert input audio speech captured by video capture device 165 to a text format, e.g., using IBM's Watson® Speech to Text (Trademark of International Business Machines Corporation), Dragon® speech recognition software (Nuance Communications, Inc.), and the like. Module 170 initiates the storing/buffering and transforming of on-line meeting conversation into natural language text data for NLP processing and for use and analysis by other modules that process the data according to the aspects of the disclosure. The textual output of the converted speech input form interaction records that are processed by other system components.

In an embodiment, another programmed processing module stored at the associated memory 150 of system tool 100 includes a Natural Language Processing (NLP) tool 175 to implement operations and techniques for analyzing the textual, natural language data for use by the other system components that perform language summarization, translation, named entity recognition, relationship extraction, speech recognition, and topic segmentation, etc. In an embodiment, NLP processing tool makes use of neural networks that enable capturing semantic properties of words, and increase learning to perform higher-level tasks such as question answering.

Another programmed processing module stored at the associated memory 150 of system tool 100 include an Action item identification extraction module 180 employing logic and instructions for operating circuitry to identify action items from the interaction records or transcripts of the meeting. An action item is a task discussed during the meeting and it needs to be addressed by a person or a small group of persons. Action item extraction module employs an NLP information extraction system applied to extraction action items. An exemplary NLP information extraction system employed is described in a reference to M. Purvery, J. Dowding, J. Niekrasz, P. Ehlen, S. Noorbaloochi and S. Peters entitled "Detecting and Summarizing Action Items in Multi-Party Dialogue", SIGDIAL 2007, the whole contents and disclosure of which is incorporated by reference herein.

Another programmed processing module stored at the associated memory 150 of system tool 100 include Action item solution extraction module 184 employing instructions to configure the system to employ NLP tool and ML-models to detect the existence of any solution(s) relating to action items for a user that were discussed during the meeting.

A further programmed processing module stored at the associated memory 150 of system tool 100 include Action item relation extraction module 188 that runs instructions to configure the system to employ NLP tool and ML-models to detect the existence of any relations between detected action items, e.g., an action item that must be performed as a precondition to resolving another action item for a user that were discussed during the meeting.

Another programmed processing module 190 stored at the associated memory 150 of system tool 100 employs instructions to configure the system to build access and/or and run supervised (or unsupervised) machine learning (ML) models for use by the other system components. For example, ML model module 190 invokes operations to train a machine learned model for learning next items related to a current identified action item. The machine learned models can include, but are not limited to: classifiers, regression models, knowledge graphs, or neural networks. For example, supervised learning (classification) techniques using a regression model are used to predict a causality of an action item or a next action-item suggestion associated with an occurrence of that particular action item, and/or unsupervised learning (clustering) techniques.

A further programmed processing module stored at the associated memory 150 of system tool 100 include summary generator 195 employing instructions to configure the system to access a pre-configured template, populate that template with extracted information pertaining to action items associated with users, including any detected solutions for resolving an action item and any detected related action items or preconditions that must be performed in order to resolve another action item for a user that were discussed during the meeting, and to present the generated summary to the user(s) of the meeting when requested.

As further shown in FIG. 1, memory 150 includes a supervisory program 110 having instructions for configuring the computing system 100 to call each of the program modules and invoke operations as described herein. In an embodiment, such supervisory program 110 calls methods and provides application program interfaces for real-time controlling receipt of real-time inputs A/V signals, interaction records, text, etc., and from the text, the determining of action items, the determining of action-item pairs with users, the determining of action-item relations, and the determining of action-item solutions for a user or meeting attendee who is late, and the generating a summary.

Figure 2:
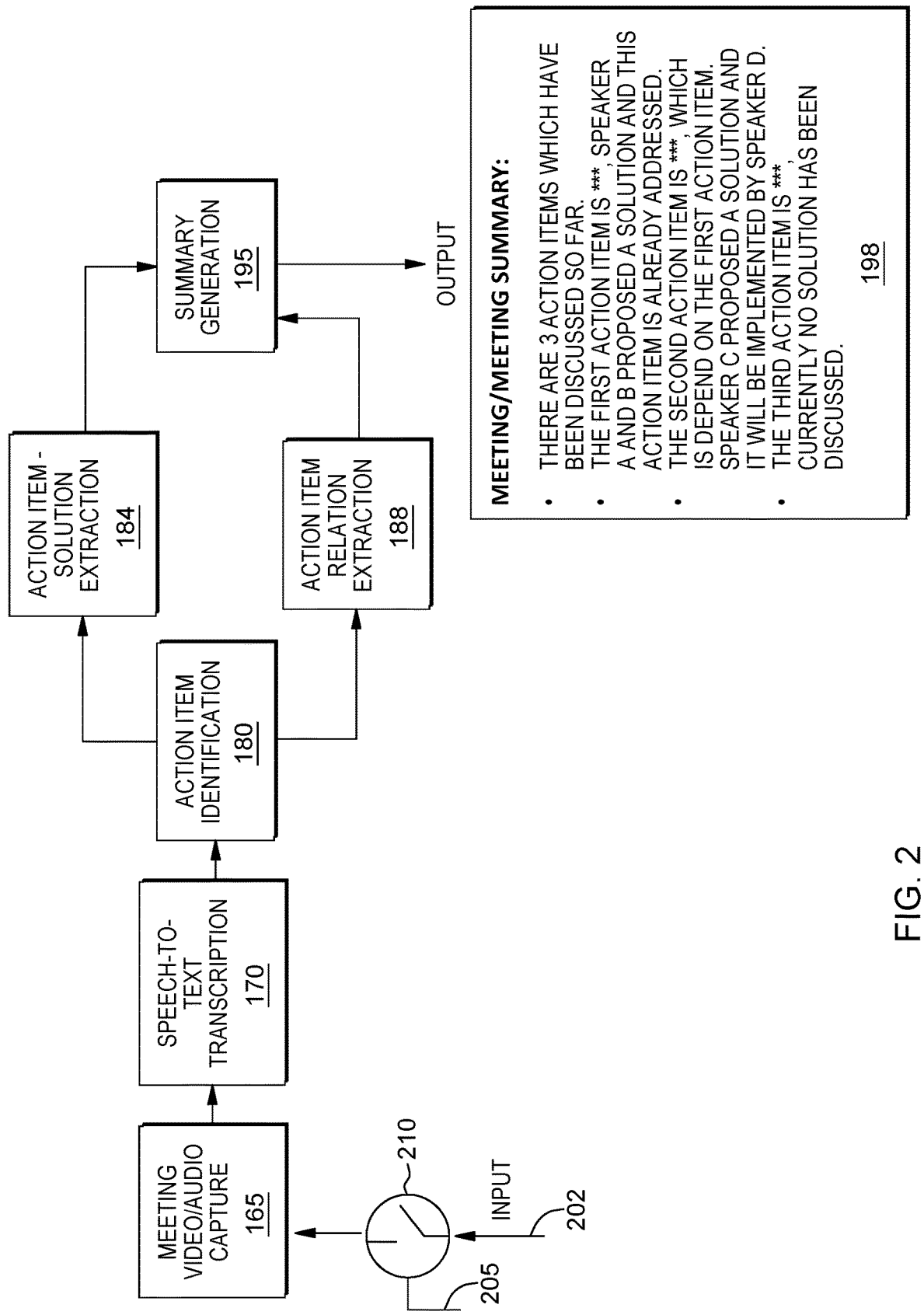
FIG. 2 depicts a flow of operations conducted by computing system tool of FIG. 1.

FIG. 2 depicts an exemplary flow of operations 200 conducted by computing system tool 100 of FIG. 1 in accordance with the supervisory program 110 for controlling recording, processing and analyzing spoken meeting data to generate action item summaries in real-time for users.

As shown in FIG. 2, a video camera or like recording device is physically set-up at a location where users are conducting a meeting, is activated to generate an input stream 202 such as an audio or A/V stream including content spoken by attendees (users) at a meeting. An A/V or audio capture device 165 is configured to receive/capture the audio or A/V stream. In an embodiment, a user or attendee can dynamically adjust recording of the meeting audio or A/V stream by the audio/video stream capture processor 165 according to the user's information needs.

That is, via the at least one application program interface 166 for controlling A/V recording, the system receives an input activation or deactivation signal 205 communicated from a user device, e.g., to trigger operations for activating the system modules and invoke operations at the modules for real-time A/V signal capture, text capture action-item determination, etc. while a user is away from the meeting, or deactivating such action-item determining operations while the user is present at the meeting.

For example, in the event that a user only wants to summarize action items for a fraction of the time of a meeting, the input can be adjusted accordingly by the user invoking an activation/deactivation or switch function for users to keep themselves updated about the meeting when they need to be away for a few minutes, are unable to arrive timely, or have to leave prior to the end of the meeting.

In such an embodiment, a switch 210 is responsive to the input activation or deactivation signal 205 to initiate the multimedia recording of the meeting and the generating of interaction records. For instance, the user or attendee can select an "activation" button via a user device interface to initiate a recording of the A/V media stream of the meeting before the user arrives at the meeting or for a time duration that the user has to leave the meeting. The meeting can be continuously recorded while the user or attendee is away from the meeting. Upon arrival at the meeting, the user or attendee may select a "deactivation" button to terminate the recording of the meeting. At such time, the system 100 will then automatically invoke operations to process the recording of the meeting and generate the summary of the action items for the corresponding time duration the user or attendee was away. Rather than selecting an activation/deactivation button via an interface, the action item summary generation system may be activated and deactivated by uttering a "wake" word via a microphone or like audio interface device.

Alternatively, in embodiments, by default, or upon agreement of the participants, the A/V stream 202 of the meeting is recorded regardless of the attendance/status of any of the attendees or meeting participants. Then, after the meeting has terminated, the system will generate the summary of the action items for each of the users for the corresponding time period.

Whether recorded for a fraction of the time of the meeting for a user by selective activation/deactivation, or whether the whole meeting A/V stream content is recorded, the recorded spoken data is input to a real-time speech-to-text converter unit 170. This speech-to-text converter unit 170 is trained to recognize each speaker's voice, transcribe the user's speech into text, and associate the text of the transcribed speech content spoken at the meeting with its respective user. The system can generate in real-time and/or store the transcription of each speaker's spoken content, e.g., speakers A-D, in the order as spoken by the respective speakers, as follows:

Speaker A: content A
Speaker B: content B
Speaker A: content A'
Speaker C: content C
Speaker D: content D
. . . .

Then, in an embodiment, the action item identifier module 180 is then invoked to identify action items from the stored transcript or interaction records of the meeting. In an embodiment, module 180 can invoked operations of a hierarchical classifier including several sub-classifier models in a two-stage process that includes: 1) detecting sub-dialogues of the meeting (i.e., short passages of conversation) in which action items are proposed, discussed and committed to, and 2) extracting the phrases that accurately capture or summarize the tasks they involve. In an embodiment, the detection of subdialogues is performed by use of a hierarchical classifier including multiple independent sub-classifiers used to detect utterances in the dialogue that express action items, and user suggestions, agreements or commitments. Then, a semantic parser is used to extract phrases from within the utterances which describe the task and a timeframe over which it is to be performed. For example, to extract timeframe and task descriptions, a rule-based NLP semantic parser is used that can find basic predicate-argument structures of major phrase types (e.g., symbols, noun phrases, verb phrases, prepositional phrases) In an embodiment, four independent classifier models 190, e.g., linear-kernal support vector machines, are run for task detection according to a set of distinct action item specific dialog acts (AIDAs) utterance classes: description of task to be performed, timeframe discussion, ownership or assignment of the responsibility, and any explicit agreement. The four independent AIDA sub-classifiers can be trained based on features (e.g., n-grams, durational, and locational features from the transcriptions, prosodic features, etc.) derived from various properties of the utterances in context. A superclassifier is then used to detect windows including captured sub-dialogue sequences based on the detected task utterances by the individual AIDA sub-classifiers.

For each user, the system generates in real-time and records each of the action items identified by the action item identifier unit 180 including an identity of the owner of the action item, a description of the task and a specification of the timeframe. For example, module 180 determines, for identified Speaker A, a list of action items, e.g.:
Action Item 1
Action Item 2
Action Item 3
....

In an embodiment, an urgency of the action items can be detected, e.g., using a determined emotional, semantic or lexical analysis of the meeting dialogue and the list of action items can be ordered in accordance with the determined urgency.

Once the action item identifier unit 180 identifies each of the action items for a particular user/speaker, the system invokes operations to determine the existence of a solution for each action item by the subject user/speaker, and extracts the solution for each of the action from the meeting transcript. For action item-solution extraction, the action item solution extraction unit 184 transforms the action item into a question-answering (QA) task. That is, given the extracted action item transformed as a question, and based on the meeting transcript as the context, the task is to extract spans from the context as the answer. Further identified is a particular user/speaker that is tasked in providing the solution of the particular action item. In an embodiment, a QA model trained on the Stanford Question Answering Dataset (SQuAD) dataset (https://rajpurkar.github.io/SQuAD-explorer/) can be transferred to perform the QA task. The SQuAD dataset has a large number of answers associated with their corresponding questions. One embodiment is to train a word embedding model on the text to which the questions relate, vectorize questions and answers with the word embedding model, and finally train a machine learning model for the QA task with the vectorized questions and answers. That is, the SQuAD dataset can be used to train the QA-model or tool. An exemplary output of the action item solution extraction unit 184 is as follows:
Action Item 1: solution1 by Speaker A/B, addressed
Action Item 2: solution2 by Speaker C, will be carried out by Speaker D
Action Item 3: open
....

To improve the performance, a user annotates the dataset (e.g., transcript—action item-solution) as feedback to further fine-tune the QA model and improve the performance of the model. As an example, assume that one action item list indicates, "This action item is open and is assigned to speaker A". But if it is not correct, speaker A gives feedback by explicitly saying, "Speaker B proposes a solution, and this action item has been already resolved." This feedback is used to re-train the QA model.

In an embodiment, concurrently with identifying a solution (or not) for each of the action items to be tasked to a particular user(s)/speaker(s) by the action item solution extraction unit 184, the system invokes operations to determines the existence of any related action items to the subject action item. That is, system tool 100 simultaneously invokes the action item relation extraction unit 188 to identify the dependent relations between action items. Such dependent relation, for example, is the determining of one action item being a precondition of another action item.

In an embodiment, an NLP textual entailment system detects whether a first action item, e.g., action 1, "entails" a second action, e.g., action 2. If such entailment is found to exist, then solving action 2 is determined dependent upon solving action 1 first, i.e.:
Action Item 1←Action Item 2

In an embodiment, once the action item solution extraction unit 184 and the action item relation extraction unit 188 identifies and extracts action item-solution pairs for a user(s)/speaker(s) and identifies any relations between action items for the particular user/speaker, the system invokes operations to generate a summary report for the user. The summary generator module 195 generates human readable meeting action item summary based on a pre-defined template having selectable statements with fields (e.g., ***) that can be populated with the corresponding information. In an embodiment, based on the extracted action item-solution pairs and the identified relations between action items, the module populates the pre-defined template fields with the information and generates a summary output 198 for presentation to the user, e.g. via the user's device display. In a non-limited example, the pre-defined template can populate statements with detailed information extracted from the action item solution/relation units. Such selectable exemplary statements with fields to be populated include, but are not limited to:
"There are *** action items which have been discussed so far."
"The first action item is *, Speaker *"
"and Speaker *** proposed a solution and this action item is already addressed."
"The second action item is ***, which is dependent upon the first action item."
"Speaker *** proposed a solution"
"and will implement it or it will be implemented by Speaker ***."
"The third action item is ***"
"Currently no solution has been discussed."

In an embodiment, system tool 100 automatically selects from among these statements, populates them with the relevant information found, and provides a summary output 198 to a user, for example, that explains the action items and respective solutions and related items as discussed at a meeting during a time responsive to the user's activation/deactivation control input. Thus, at a time the user enters the meeting, or returns to a meeting after having left the meeting for a time duration, the user can immediately be made aware of the user's action items and hence responsibilities as discussed during that time duration.

Figure 3A:
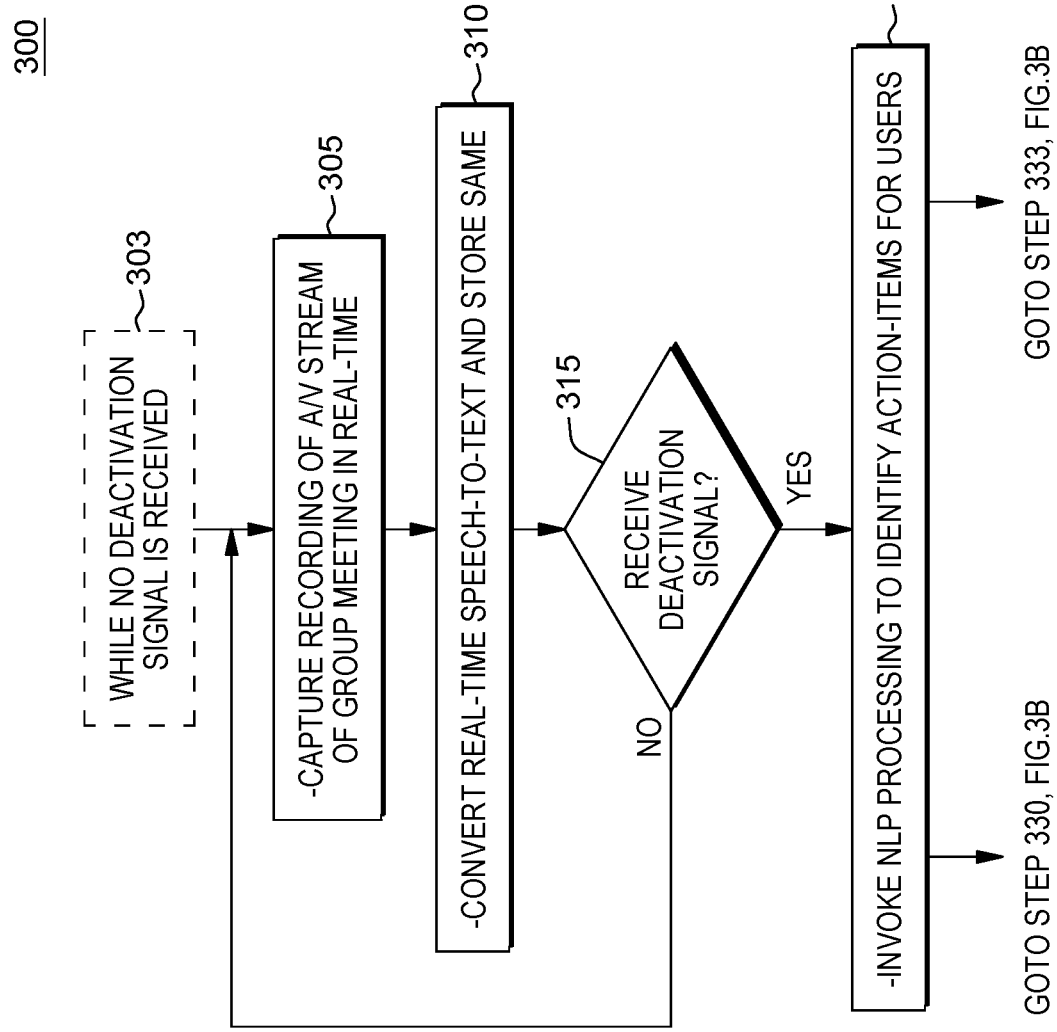
FIGS. 3A-3B depict an example automated method carrying out operations to generate action item summaries including next actions in real time for users in an embodiment.
Figure 3B:
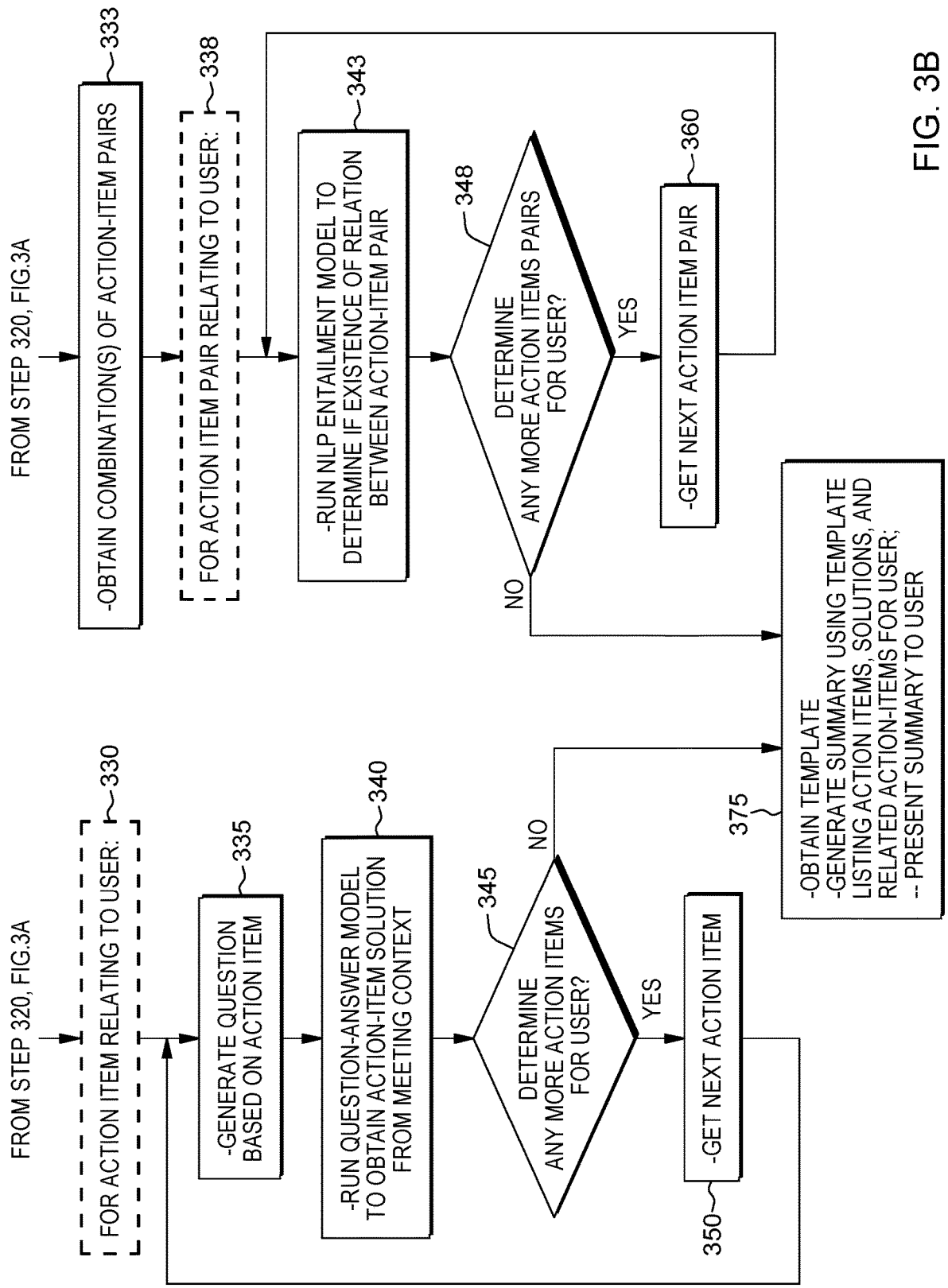

FIGS. 3A-3B shows an example automated method 300 run by supervisory program 110 for generating action items summaries for groups of multiple users.

At a first step 303, at the time of a meeting among a group of users/attendees, a determination is made that no user input deactivation control signal has been received, or alternatively, that an activation signal has been received. In response, at 305, the system initiates recording/capture of the spoken content at the group meeting in real-time, and at 310 initiates the converting of the real-time speech-to-text and storage of the text. Then, at 315, a determination is continuously made whether an interrupt deactivation signal entered by the user has been received which would initiate a stopping of the receipt, recording and speech converting of the A/V stream. If no interrupt signal is received at 315, the method continues to record the meeting as shown by the continuous return to step 305. Otherwise, at 315, once a deactivation signal is received, or by default, if the group meeting has ended, the process continues to 320 to invoke NLP processing and the hierarchical classifier processing to identify action-items for each of the users at the action item detector module 170.

In alternative embodiments, the input that is received can include interacting records in natural language text from inputs including, but not limited to: instant messages exchanges, messages in a message board, messages received in a chat room or message board, and/or text converted from audio from a meeting scenario or other meeting transcripts, emails threads, social media messages/text, video streams in which textual data is extracted and NLP applied.

From step 320, FIG. 3A, the process continues in simultaneous paths to step 330, FIG. 3B and step 333, FIG. 3B. At 330, FIG. 3B, for each action item determined owned by a user, the action item solution extraction unit 184 generates a question based on action item at 335. For example, upon extracting "action item 1" the module will re-phrase it as a corresponding question, e.g., "What is solution for action item 1". Then, at 340, there is run a Question-Answer model to obtain action-item solution from the context determined from meeting dialogue transcript. For example, using any question-answering system, e.g., IBM's Watson deep QA architecture, the formed question can be parsed into different keywords and sentence fragments in order to find a statistically related phrase(s) from the meeting transcript history records. Continuing to 345, FIG. 3B, a determination is made as to whether there are any more action items for that user. If there are more action items for that user, then the process proceeds to 350 where the next action item is retrieved and the process returns to 335, FIG. 3B where the steps to form a related question from the action item and the QA processing is performed to again find an answer to that question, i.e., a solution for that action item. The steps through 345 are repeated for each action item found for that user until such time when at 345 it is determined that there are no more action items for that user in which case the process proceeds to a summary generator step at 375 where a template is obtained, and a summary is generated using the template to populate the template with information such as a listing action items, the identified speaker, and a corresponding solution, i.e., how the user is to resolve the action item if the action item is to be resolved at all.

Returning to step 333, FIG. 3A, the process simultaneously performs a step to obtain combinations of pairs of action items. For three (3) action items, such pairs can include for example:
 action item 1→action item 2
 action item 1→action item 3
 action item 2→action item 3
 . . . .

Then, at 338, for each action item pair relating to user, the method advances to 343, FIG. 3B where the method runs a NLP entailment model to determine whether there exists a relation between the action-item pairs or whether no relation exists (no correlation or neutral). In particular, at 343, an NLP tool finds a directional relation between text fragments, e.g., whether one action item pair can be inferred from another. The relation holds whenever the truth of one text fragment follows from another text. In the NLP entailment framework, the entailing text is an action item text and the entailed text is another action item (hypothesis) and the NLP model determines whether or not the hypothesis is entailed by the text. Using a data set of examples that are labeled for entailment, techniques are used from supervised machine learning to learn a statistical classifier, e.g., a logistic regression classifier. The input for the classifier are two sentences or phrases (e.g., S1—submit a claim for reimbursement, S2—submit an expense request), the output of the classifier will be the relations between S1 and S2 in terms of entailment. If the classifier predicts that S1 entails S2, it means that action S2 will happen before action S1.

Continuing to 348, FIG. 3B, a determination is made as to whether there are any more action items pairs for that user. If there are more action items pairs for that user, then the process proceeds to 360 where the next action item pair is retrieved and the process returns to 343, FIG. 3B where the steps to run the NLP entailment model based on the text fragments of the next action item pairs is performed to again to determine a relation for that action item pair. The steps through 345-360 are repeated for each action item pair found for that user until such time when at 348 when it is determined that there are no more action item pairs to process for entailment for that user in which case the process proceeds to a summary generator step at 375 where the template is obtained, and the related action items are added to the summary for that user.

Finally, at 375, FIG. 3B, the summary generated by the system 100 is output to that user's designated device for presentation to the user. This output can include, for a particular user: a summary of the interactive records including a summary of the action items with specification of to whom the action item is assigned, which action items are closed (done) or open, and relations between these action items (e.g., dependency, who needs to work on open items, and who did the closed ones and how they are done).

In further embodiments, the system can receive feedback manually entered by a user to the system and respond to other users and their actions. For example, to improve performance of the QA task, a user can annotate the dataset (transcript—action item—solution) to further fine-tune and improve the QA model. One embodiment is to use the action items which appear in the actual meetings transcripts in the system. Based on the user feedback on the action items, an additional training set is generated. This training set is used to further train the QA model.

Figure 4:
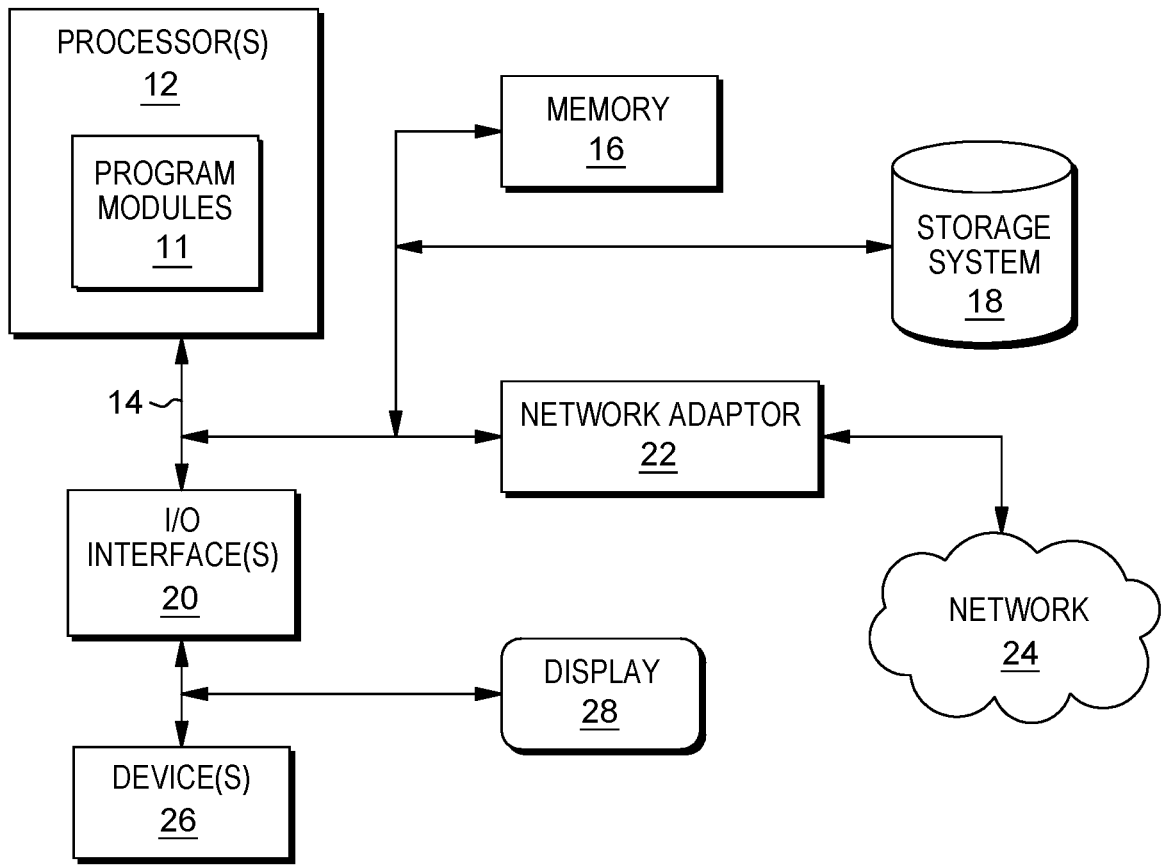
FIG. 4 illustrates a schematic of an example computer or processing system according to embodiments of the present invention.

FIG. 4 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIGS. 3A-3B).

The components of the computer system may include, but are not limited to, one or more processors or processing units 12, a memory 16, and a bus 14 that operably couples various system components, including memory 16 to processor 12. In some embodiments, the processor 12 may execute one or more modules 11 that are loaded from memory 16, where the program module(s) embody software (program instructions) that cause the processor to perform one or more method embodiments of the present invention. In some embodiments, module 11 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
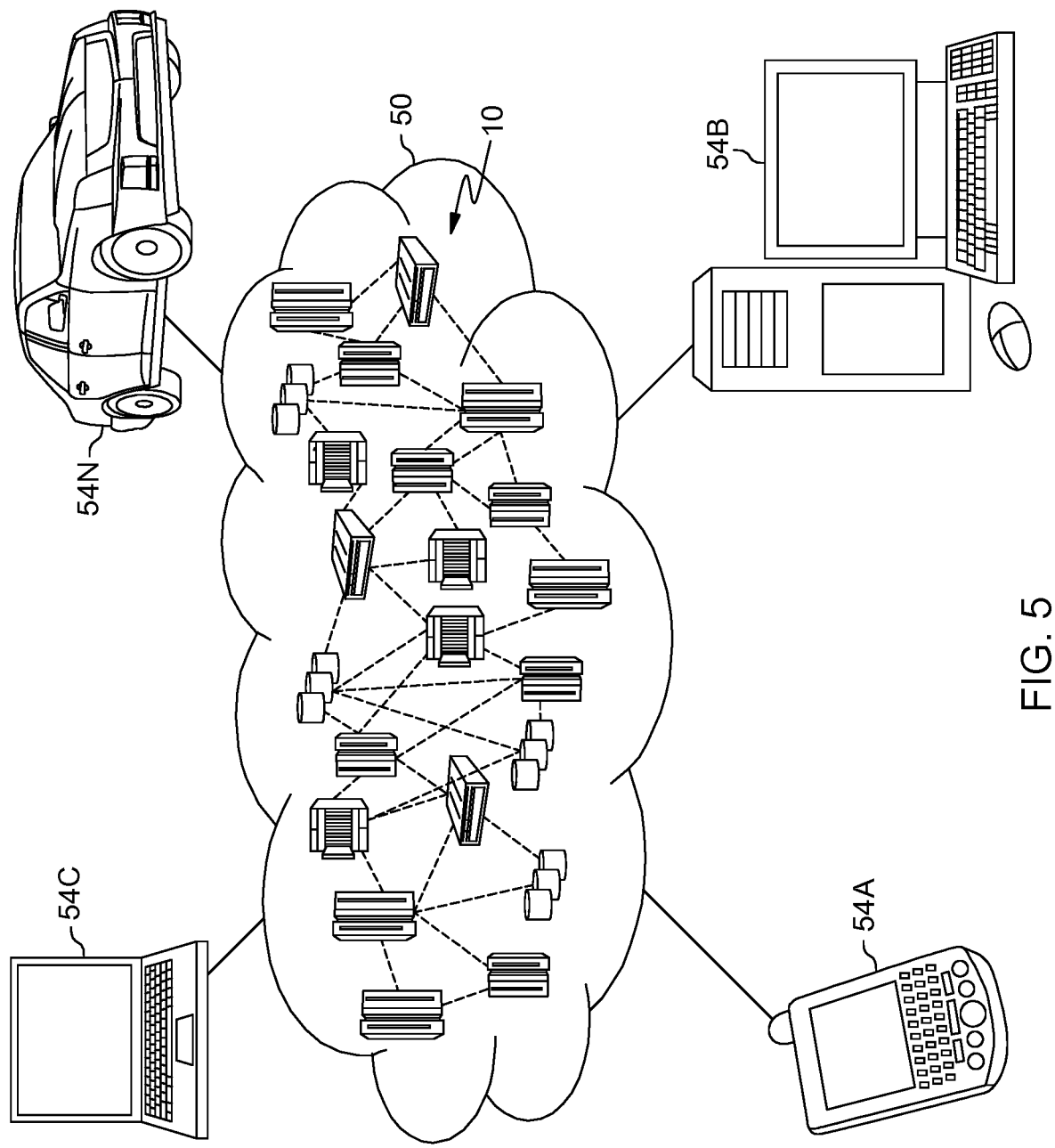
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
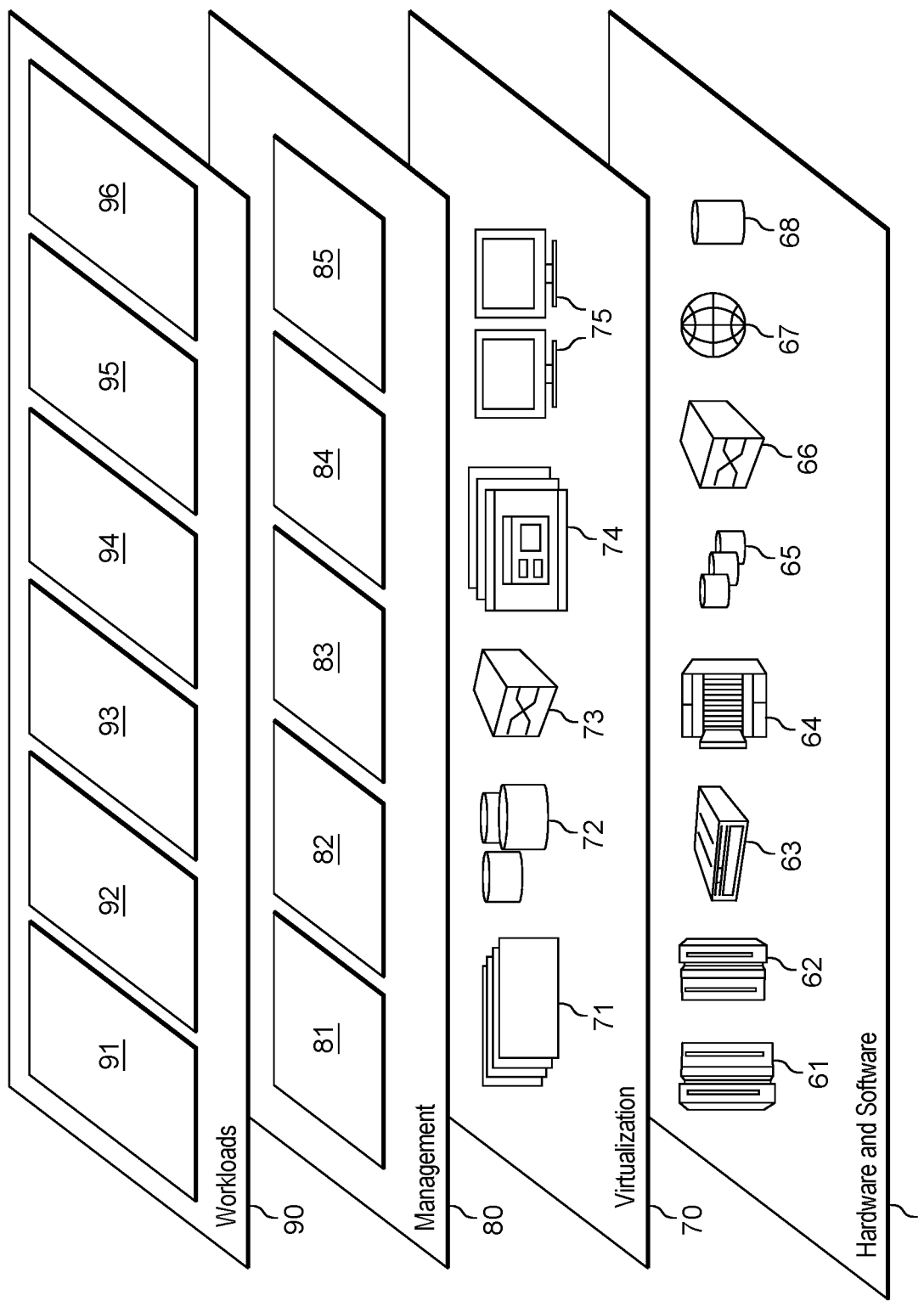
FIG. 6 depicts abstraction model layers according to an embodiment of the present invention.

Referring now to FIG. 6, a set of functional abstraction layers provided by cloud computing environment 50 (FIG. 10) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 to automatically generate a summary and next actions in real time from interaction records in natural language according to aspects of the present disclosure.

What is claimed is:

1. A computer-implemented method comprising:
receiving, at one or more processors, multiple interaction records of natural language text relating to a group of users attending a meeting;
analyzing, using one or more classifier models, said text of said multiple interaction records to identify one or more action items from said text, an action item relating to a respective task to be performed;
detecting, from said interaction records, a respective user assigned to perform the respective task;
detecting, from said interaction records, whether each action item from the identified one or more action items is addressed with a solution for carrying out said task or not, said detecting, from said interaction records, whether each action item from the identified one or more action items is addressed with a solution for carrying out said task comprising:
converting a detected action item into a question form;
forming a question-answering task; and
running a trained question-answering model for extracting spans from said interaction records, and determining whether an answer to the question exists from an extracted span;
identifying, using a natural language processing (NLP) entailment model, whether any action item from the identified one or more action items is dependent upon another action item from the identified one or more action items, or whether an action item relating to a task is a precondition to performing another action item task from the identified one or more action items; and
generating a text summary of a solution that addresses each action item for the user based upon the identifying and the determining that the answer to the question exists from the extracted span.

2. The computer-implemented method as claimed in claim 1, further comprising:
receiving a real-time audio signal stream or audio/video signal stream capturing users spoken content at said meeting; and
converting said real-time audio signal stream or audio/video signal stream into a textual representation to form said multiple interaction records.

3. The computer-implemented method as claimed in claim 1, further comprising:
receiving, at said one or more processors, one of: an activation signal to initiate said receiving of interaction records, said analyzing, said action item detecting and said summary generating, at a beginning of or during said meeting, or a deactivation signal to terminate said receiving of said interaction records, said analyzing, said action item detecting and said summary generating during said meeting.

4. The computer-implemented method as claimed in claim 1, wherein said generating a summary of a solution that addresses each action item for the user further comprises:
obtaining a template having pre-defined fields for receiving information related to said action items detected in said interaction records; and
populating said template with action item information including a corresponding user owning that action item, and for each action item: specifying in said template information comprising: the solution to said action item and/or any precondition action item upon which an action item depends.

5. The computer-implemented method as claimed in claim 4, further comprising:
receiving, from a user, based on said populated template summary information, a feedback information relating to an action item task, its detected corresponding user, a solution to said action item; and
using said feedback information to refine tuning one or more of: said one or more classifier models, the trained question-answering model, and said NLP entailment model.

6. A computer-implemented system comprising:
a memory storage device for storing a computer-readable program, and at least one processor adapted to run said computer-readable program to configure the at least one processor to:
receive multiple interaction records of natural language text relating to a group of users attending a meeting;
analyze, using one or more classifier models, said text of said multiple interaction records to identify one or more action items from said text, an action item relating to a respective task to be performed;
detect, from said interaction records, a respective user assigned to perform the respective task;
detect, from said interaction records, whether each action item from the identified one or more action items is addressed with a solution for carrying out said task or not, wherein to detect, from said interaction records, whether each action item from the identified one or more action items is addressed with a solution for carrying out said task, said at least one processor is further configured to:
convert a detected action item into a question form;
form a question-answering task; and
run a trained question-answering model for extracting spans from said interaction records, and determine whether an answer to the question exists from an extracted span;
identify, using a natural language processing (NLP) entailment model, whether any action item is dependent upon another action item or whether an action item relating to a task is a precondition to performing another action item task; and
generate a text summary of a solution that addresses each action item for the user based upon the identifying and the determining that the answer to the question exists from the extracted span.

7. The computer-implemented system as claimed in claim 6, wherein said at least one processor is further configured to:
receive a real-time audio signal stream or audio/video signal stream capturing users spoken content at said meeting; and
convert said real-time audio signal stream or audio/video signal stream into a textual representation to form said multiple interaction records.

8. The computer-implemented system as claimed in claim 6, wherein said at least one processor is further configured to:
receive one of: an activation signal to initiate said receiving of interaction records, said analyzing, said action item detecting and said summary generating, at a beginning of or during said meeting, or a deactivation signal to terminate said receiving of said interaction records, said analyzing, said action item detecting and said summary generating during said meeting.

9. The computer-implemented system as claimed in claim 6, wherein to generate a summary of a solution that addresses each action item for the user, said at least one processor is further configured to:

obtain a template having pre-defined fields for receiving information related to said action items detected in said interaction records; and populate said template with action item information including a corresponding user owning that action item, and for each action item: specifying in said template information comprising: the solution to said action item and/or any precondition action item upon which an action item depends.

10. The computer-implemented system as claimed in claim 9, wherein said at least one processor is further configured to:

receive, from a user, based on said populated template summary information, a feedback information relating to an action item task, its detected corresponding user, a solution to said action item; and use said feedback information to refine tuning of one or more of: said one or more classifier models, the trained question-answering model, and said NLP entailment model.

11. A computer program product, the computer program product comprising a computer-readable storage medium having a computer-readable program stored therein, wherein the computer-readable program, when executed on a computer including at least one processor, causes the at least one processor to:

receive multiple interaction records of natural language text relating to a group of users attending a meeting;

analyze, using one or more classifier models, said text of said multiple interaction records to identify one or more action items from said text, an action item relating to a respective task to be performed;

detect, from said interaction records, a respective user assigned to perform the respective task;

detect, from said interaction records, whether each action item from the identified one or more action items is addressed with a solution for carrying out said task or not, wherein to detect, from said interaction records, whether each action item from the identified one or more action items is addressed with a solution for carrying out said task, the computer-readable program further configuring the at least one processor to:

convert a detected action item into a question form;

form a question-answering task; and run a trained question-answering model for extracting spans from said interaction records, and determine whether an answer to the question exists from an extracted span;

identify, using a natural language processing (NLP) entailment model, whether any action item is dependent upon another action item or whether an action item relating to a task is a precondition to performing another action item task; and generate a text summary of a solution that addresses each action item for the user based upon the identifying and the determining that the answer to the question exists from the extracted span.

12. The computer program product as claimed in claim 11, wherein the computer-readable program further configures the at least one processor to:

receive one of: an activation signal to initiate said receiving of interaction records, said analyzing, said action item detecting and said summary generating, at a beginning of or during said meeting, or a deactivation signal to terminate said receiving of said interaction records, said analyzing, said action item detecting and said summary generating during said meeting.

13. The computer program product as claimed in claim 11, wherein to generate a summary of a solution that addresses each action item for the user, the computer-readable program further configures the at least one processor to:

obtain a template having pre-defined fields for receiving information related to said action items detected in said interaction records; and populate said template with action item information including a corresponding user owning that action item, and for each action item: specifying in said template information comprising: the solution to said action item and/or any precondition action item upon which an action item depends.

14. The computer program product as claimed in claim 13, wherein the computer-readable program further configures the at least one processor to:

receive, from a user, based on said populated template summary information, a feedback information relating to an action item task, its detected corresponding user, a solution to said action item; and use said feedback information to refine tuning of one or more of: said one or more classifier models, the trained question-answering model, and said NLP entailment model, use the explanation or reason as a recommendation to prospectively change a condition of an existing policy in anticipation of a future occurring event.

\* \* \* \* \*